PHASE STABLE DIVIDER

Filed Dec. 12, 1956 4 Sheets-Sheet 1

INVENTORS
Paul W. Albro
Victor F. Cartwright,
BY
B. L. Zangwill
ATTORNEY

INVENTORS
Paul W. Albro
Victor F. Cartwright,

BY

B. L. Zangwill
ATTORNEY

May 5, 1959 | P. W. ALBRO ET AL | 2,885,553

PHASE STABLE DIVIDER

Filed Dec. 12, 1956 | 4 Sheets-Sheet 3

INVENTORS
Paul W. Albro
Victor F. Cartwright,

BY

B. L. Zangwill
ATTORNEY

May 5, 1959 P. W. ALBRO ET AL 2,885,553

PHASE STABLE DIVIDER

Filed Dec. 12, 1956 4 Sheets-Sheet 4

INVENTORS

Paul W. Albro
Victor F. Cartwright,

BY

B. L. Zangwill
ATTORNEY

United States Patent Office 2,885,553

Patented May 5, 1959

2,885,553

PHASE STABLE DIVIDER

Paul W. Albro, Hawthorne, and Victor F. Cartwright, Pasadena, Calif., assignors, by mesne assignments, to the United States of America as represented by the Secretary of the Navy Application December 12, 1956, Serial No. 627,966

6 Claims. (Cl. 250—27)

This invention relates to an electronic frequency divider; more particularly it relates to a phase stable divider, and specifically to a phase stable divider employing circuitry whereby phase slippage is rendered negligible.

The electronic dividers of the prior art normally use a gate followed by a gate control circuit which is triggered or synchronized by the gate output. The input signal to be divided is applied to the gate input after conversion to a series of pulses. Each pulse that passes through the gate will trigger the gate control circuit which will in turn permit the gate to be opened or closed, as the case may be, for a predetermined period, blocking the next succeeding pulses. In a scale-of-five divider for example, each pulse passed by an open gate would trigger the gate control circuit to block the next four pulses. The gate would open again to pass the sixth pulse, which would then repeat the previous cycle of events. Thus, only one out of five pulses would appear at the output of the scale-of-five divider. The output pulses are used to synchronize a multivibrator or otherwise used to produce a square or sine wave at one-fifth the frequency of the input wave.

This type of divider used singly is well known and appears in many forms, all using the same basic principle. One important form uses a normally open gate. The first pulse to pass through this gate triggers the gate control circuit which then acts to close the gate for a definite period of time, then permits it to open. The gate remains open until another pulse passes through it to again trigger the gate control circuit. Should any pulse passed by the gate fail to trigger the gate control circuit, then the next succeeding pulse would pass through the gate and would probably succeed. Normal operation would then resume, except that the output would have slipped behind in phase one full cycle of the input signal. Another important form uses a normally closed gate. Its operation must be initiated manually. Once in operation, a pulse passed by the gate is either delayed or it causes a delay circuit such as a one-shot multivibrator to go into operation. At the end of the predetermined delay period the gate is caused to open for a short period intended to coincide with the next desired pulse. Again in a scale-of-five divider, for example, the next desired pulse would be every sixth pulse. The desired pulse would normally pass through the gate during this short open period, and the entire chain of events would be repeated. If the gate control circuit failed to trigger in this type of circuit, operation would cease entirely.

As pointed out above, in the construction of prior art dividers there inevitably occurs some slippage in the phase of the output and even in the most carefully designed dividers. The reasons for such slippage are not fully understood but it appears to be due to the occasional and unexplained failure to trigger of the trigger circuits used in the dividers. A failure to trigger may occur only once in billions of operations of the trigger circuit but this is too frequent for some applications; for example, circuits designed to divide 100 kilocycles down to 200 cycles rarely operate more than two or three days before phase slippage occurs.

This invention greatly reduces the probability that a slippage will occur. As pointed out in the description of the prior art, it is the gate control circuits that will occasionally fail to trigger, with the result that phase slippage of the output or complete cessation of operation occurs. This invention circumvents such failures by employing two or more parallel divider channels with the gate circuits so connected that operation of one gate will initiate simultaneous operation of the corresponding gate in the opposite channel, and, should either gate control circuit fail to trigger then the other would still operate both the gates in the normal way. More particularly, assuming a scale five divider, if the gates are of the normally open type, and if either gate control circuit is triggered both gates wil be closed for the next four cycles of the input signal. If the gates are of the normally closed type and if either gate control circuit is triggered, both gates will be opened for a short time after a delay of better than four cycles of the input frequency. The probability that both gate control circuits would simultaneously fail to trigger is vastly smaller than the probability that one will fail to trigger at a time.

It is an object of this invention therefore to provide a stable frequency divider which is reliable in operation over long periods of time without phase slippage.

Another object of this invention is to provide a phase stable divider wherein the probability of phase slippage is rendered negligible.

Still another object of the invention is to provide a multiple stage divider for division by large factors.

It is a further object of this invention to provide a frequency divider employing circuitry wherein a failure in one part thereof is automatically compensated by another part.

Other objects and many of the attendant advantages of this invention will be readily appreciated as the same becomes better understood by reference to the following detailed description when considered in connection with the accompanying drawings wherein.

Figures 1, 2:
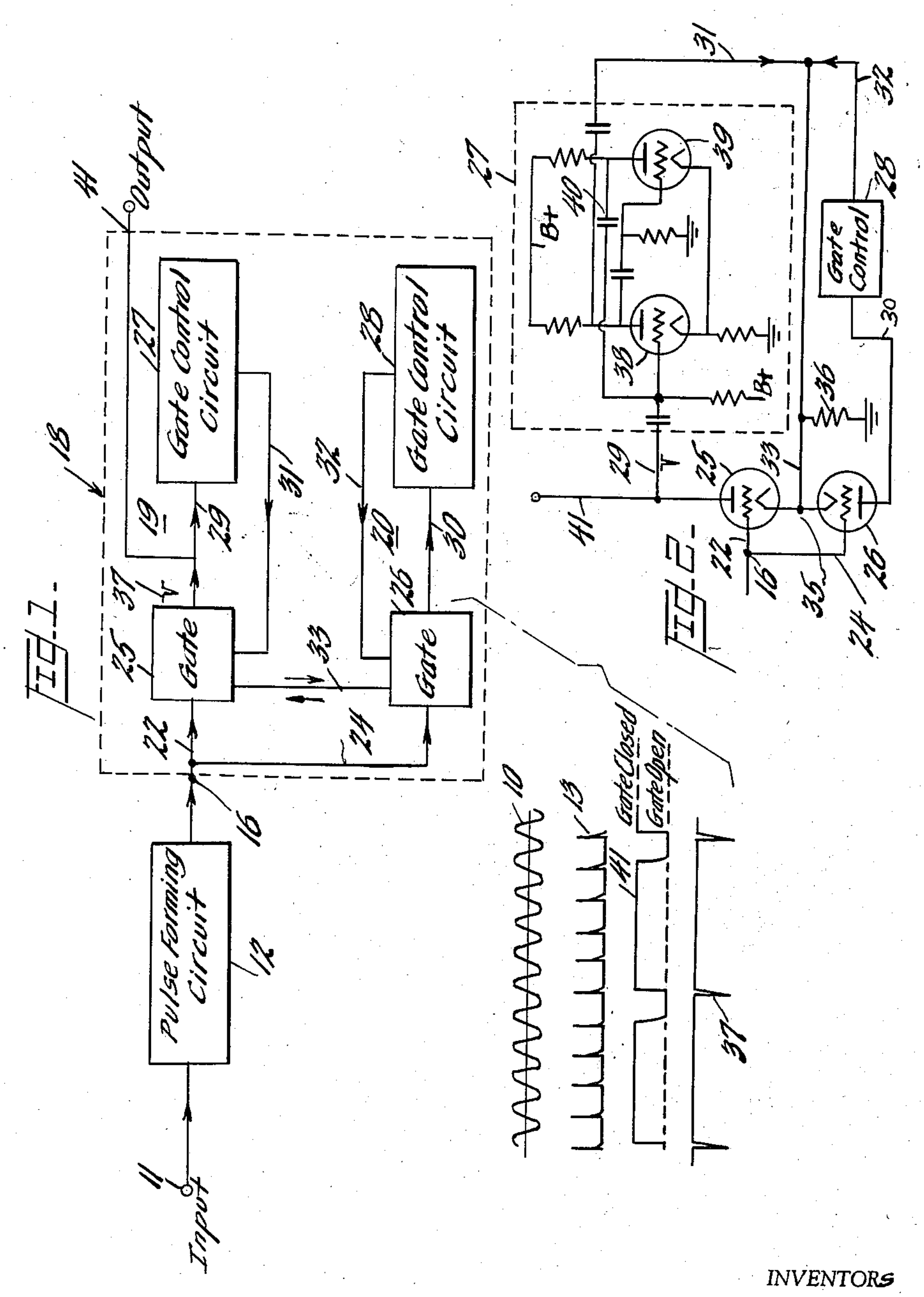
Fig. 1 is a block diagram showing a basic circuit arrangement of the invention including explanatory wave forms.
Fig. 2 is a schematic diagram illustrating one possible way of interconnecting normally open gate circuits in Fig. 1 to one another and to the control circuits in the parallel channels.

Referring now to the drawings, wherein like reference characters designate like or corresponding parts throughout the several views, there is shown in Fig. 1 and subsequent figures a set of voltage wave forms drawn on a common time scale and illustrating the operation of a scale-of-$n$ divider where $n=5$. A signal of predetermined frequency, illustrated as a sine wave 10, to be divided by five is applied to the input terminal 11 of a pulse forming or trigger circuit 12, forms of which are well known to the art, and which forms no part per se of the invention. The pulse forming circuit 12 is adapted to convert the input wave form into a series of pulses 13, positive or negative, having a pulse repetition frequency equal to the frequency of the input wave form 10. The series of pulses 13 from circuit 12 are applied to an input terminal 16 of the phase stable divider circuit 18 of the invention. The phase stable divider circuit comprises at least a pair of identical channels generally designated by 19 and 20 connected in parallel with input terminal 16 over conductors 22 and 24. Channels 19 and 20 comprise respectively gate circuits 25 and 26 and gate control circuits 27 and 28 connected to their respective gate circuits over conductors 29 and 30. The gate control circuits in a preferred embodiment comprise one-shot multivibrators or flip-flop circuits, many forms of which are well known in the art, having only one stable state. The outputs of the gate control circuits 27 and 28 are applied back over conductors 31 and 32 to the gate circuits whereby the gates are either opened or closed depending upon whether normally open or normally closed types of gate circuits are employed. The gate circuits 25 and 26 in each channel are interconnected by means illustrated as a conductor 33 so that if either of the gate control circuits 27 or 28 fails to trigger, the other will be controlling as will be explained with reference to Fig. 2.

Referring to Fig. 2, the gate circuits 25 and 26, which may take any of known forms, are shown for purpose of illustration as comprising triodes 25 and 26 having cathode, grid and plate circuits; it being understood that more than one stage may be employed where pulse inversion is necessary. As seen in the figure the cathodes are connected together at 35 and to ground through a common resistor 36. The grids are connected to terminal 16, and the plates are connected over conductors 29 and 30 to the gate control circuits 27 and 28.

The gate control circuits, only one of which is schematically illustrated, comprise as heretofore stated monostable multivibrators, and in a preferred embodiment one-shot multivibrators, having the grids of their normally conducting halves 38 returned to B+ whereby halves 38 are responsive to negative trigger pulse inputs. Such multivibrators are known to the art as positive grid return multivibrators. It is to be understood that one-shot multivibrators responsive to positive triggers and known as cathode return multivibrators may also be utilized where the series of pulses are negative or by employing a pulse inverting stage before or transformer coupling between the gating triodes 25 and 26 and the pulse forming circuit 12.

In operation as a scale-of-five divider, assuming gates 25 and 26 are normally open, the first pulse of the series of positive pulses 13 will pass through the gates 25 and 26 simultaneously. The amplified inverted pulses 37 are applied to the grid of the normally conducting half 38 of the positive grid return multivibrator. As is understood in the art the negative pulses 37 will trigger the multivibrators to their unstable states; and, where the multivibrators have slipped, synchronize them to the proper frequency. The pulses 37 will increase the plate voltages of normally conducting halves 38 whose plates are coupled to the grids of the normally non-conducting halves 39 whose plate voltage decreases are coupled back to the grids of the normally conducting halves 38. The action is rapidly progressive until halves 38 are cut off and halves 39 are conducting. This unstable condition continues until capacitors 40 in each multivibrator have discharged sufficiently to allow the grids of halves 38 to rise above cut off, initiating a reverse action which returns the multivibrators to their stable state. The positive square wave outputs 41 taken from the plates of normally conducting halves 38 are of a time duration as determined by the RC time constants of the multivibrators and are made of a duration equal to four cycles of the input in the example shown. The positive square waves 41 are applied over conductors 31 and 32 across resistor 36, making the cathodes of the gating triodes 25 and 26 positive with respect to their grids, thereby biassing to cut off the gates for the duration of the square wave pulses. As may be seen should one of the multivibrators 27 or 28 fail to trigger at the proper time, the output of the other will be sufficient to cut off both gates. As shown in Fig. 1 the divider output may be taken from one of the plate circuits over conductor 41, or both of the plate circuits of the gates, and utilized to trigger another square wave generator whose output may be filtered to obtain a sine wave at 1/5 the frequency of the input wave.

As may be seen from Fig. 1, since gates 25 and 26 are connected so that operation of either by its gate control circuit initiates simultaneous operation of the other, they are equivalent to a single gate and the basic circuit of Fig. 1 may be so modified. However using separate gates has some advantages in reliability, since a component failure in either gate circuit would not completely disrupt the operation of the divider.

Figure 3:
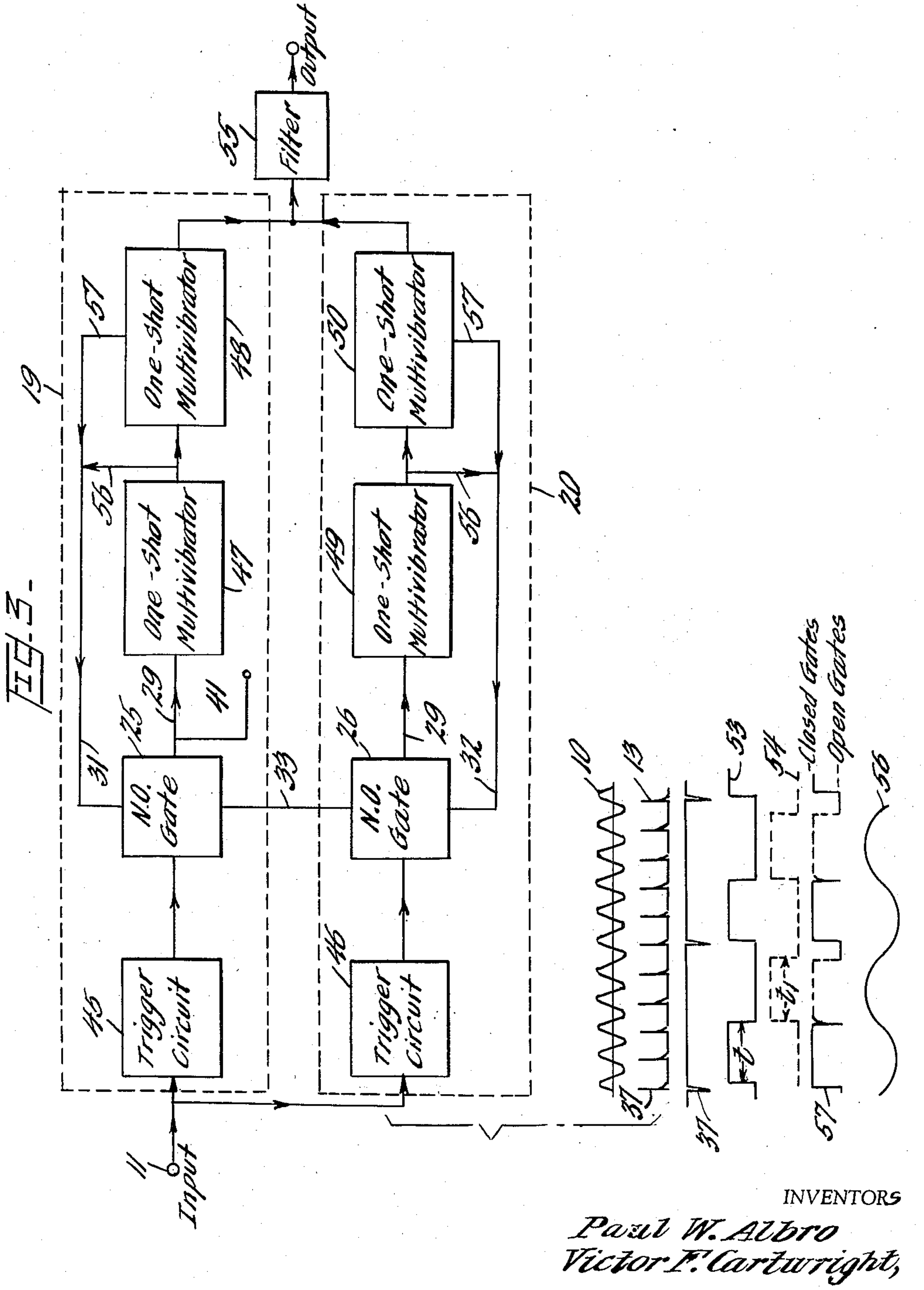
Fig. 3 is a block diagram of a practical divider circuit similar to Fig. 1 employing normally open gates and including explanatory wave forms.

Referring to Fig. 3 there is shown a more detailed divider in accordance with the basic arrangement of Fig. 1. Fig. 3 differs from Fig. 1 in that each of the channels 19 and 20 are provided with separate pulse forming or trigger circuits 45 and 46 to convert an input wave 10 into a series of pulses 13; it being understood that one trigger circuit will suffice. Fig. 3 also differs from Fig. 1, in that, in channel 19 a first one-shot multivibrator 47 and a second one-shot multivibrator 48 are connected in series, with the plate of the normally conducting half of the first multivibrator coupled to the grid of the normally conducting half of the second multivibrator 48, to form the gate control circuit 27 of Figs. 1 and 2; and, in channel 20, a first one-shot multivibrator 49 and a second one-shot multivibrator 50, also serially connected together, form the gate control circuit 28 of Figs. 1 and 2. Multivibrators 47, 48, 49 and 50 are, in a preferred embodiment, all positive grid return one-shot multivibrators as illustrated in Fig. 2. The use of two multivibrators in series in each channel over the one described in Fig. 1 is that certain undesirable transient effects are overcome by allowing each multivibrator a longer rest period between cycles.

The positive square wave outputs 53 and 54 taken from the plates of normally conducting halves of multivibrators 47 and 48, and 49 and 50 in channels 19 and 20 respectively during their unstable states are coupled back to their respective gate circuits over conductors 56 and 57. The gate circuits are again interconnected as described in Figs. 1 and 2.

In operation the first one-shot multivibrators 47 and 49 following the gates 25 and 26 are triggered to their unstable states by the first pulse 37 in the series of pulses 13 passed by the normally open gates. In their unstable state, the one-shot multivibrators 47 and 49 apply positive square wave voltages 53, derived from the normally conducting halves of multivibrators 47 and 49 during their unstable states, to their respective gates which closes the gates for a period of time $t$. After the period of time $t$, the first one-shot multivibrators 47 and 49 are self-triggered back to their stable states, and, in so doing trigger the second multivibrators 48 and 50 to their unstable states. This is accomplished through differentiation of the positive square wave voltages 53 by any suitable means such as an RC circuit which may be that in the grid input circuit of the normally conducting halves of the second multivibrators 48 and 50. The resulting negative pulses (the positive pulses resulting from differentiation have no effect on the normally conducting halves of the second multivibrators) are applied to the normally conducting halves of the second one-shot multivibrators 48 and 50. Hence when the first multivibrators 47 and 49 are self-triggered back to their stable state, the second multivibrators are triggered to their unstable states. In their unstable state the plates of the normally conducting halves of the second multivibrators continue to apply positive square wave voltages 54 to the gates, maintaining them closed for another period of time, $t_2$. There-after the second multivibrators 48 and 50 are also self-triggered back to their stable states and the gates 25 and 26 resume their normally open state. The sum of the operating cycles of both one-shot multivibrators in each channel producing the gate closing wave form 57 is equal to the time $(t+t_1)$ that the gates are required to be maintained closed, which time would be slightly over $n-1$ input cycles for an $n$-to-1 divider.

As in Fig. 1 either the pulsed output of the gates may be taken as the divider output over conductor 41, or as shown in Fig. 3, the rectangular wave from the normally non-conducting halves of one or both of the multivibrators 48 and 50 may be used as the divider output. This rectangular wave may be applied to an appropriate filter 55 and converted into a sine wave 56 at the frequency of the desired divider output which in the example is ⅕ the frequency of the input wave. The advantage of superimposing the outputs of both channels is that normal operation will continue in spite of a failure in one channel.

Figures 4, 5:
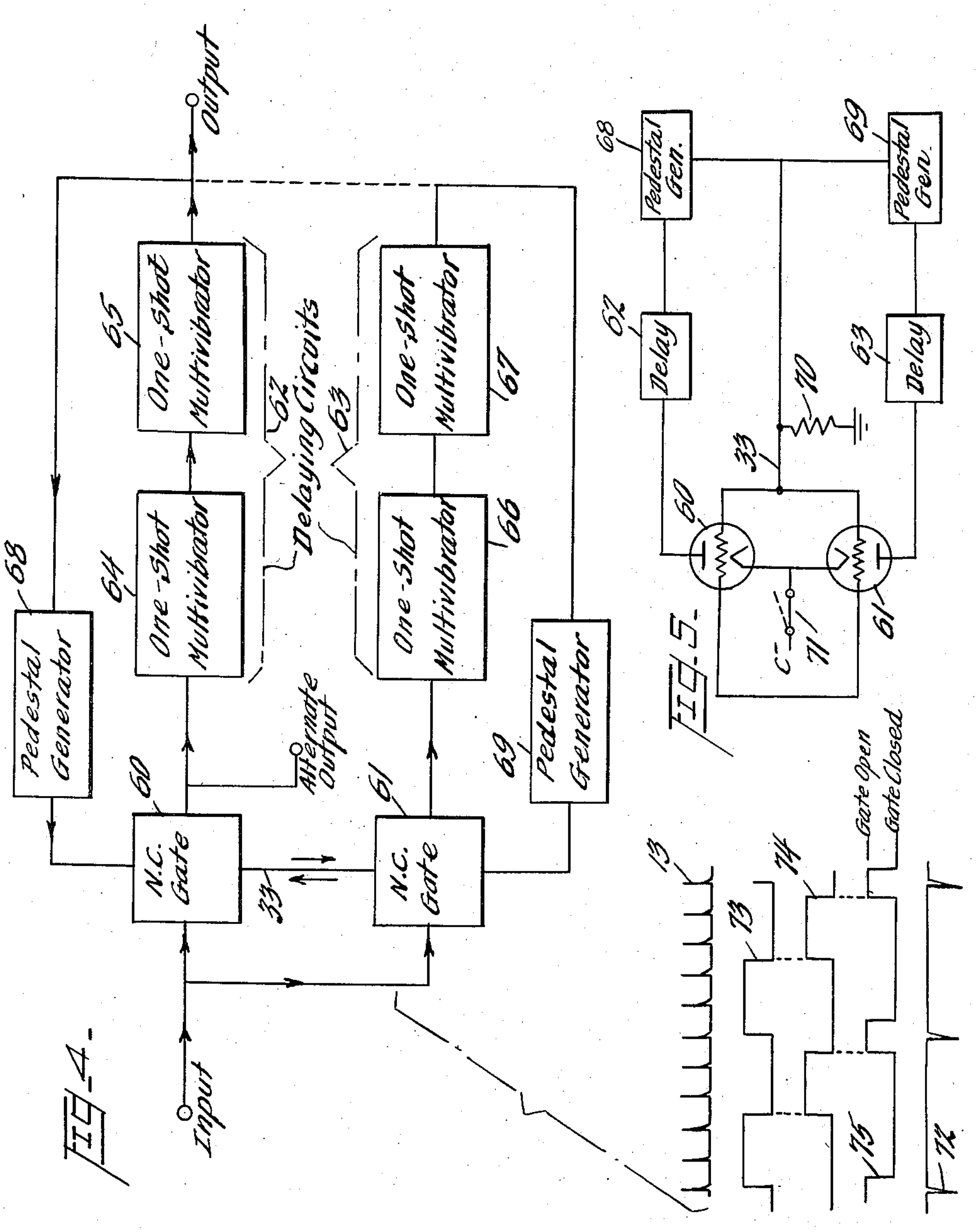
Fig. 4 is a block diagram of an arrangement similar to Fig. 3 employing normally closed gates.
Fig. 5 is a partial schematic diagram illustrating one possible way of interconnecting the normally closed gates of Fig. 4 to one another and to the parallel control circuits.

Referring now to Fig. 4 there is shown a divider employing normally closed gate or coincidence circuits comprising as before at least two parallel channels. Each channel comprises normally closed gating or coincidence circuits, 60 and 61, interconnected by conductor 33 and having their output connected respectively to delay circuits 62 and 63; the latter circuits comprising respectively, in a preferred embodiment, two serially connected one-shot multivibrators 64 and 65 and 66 and 67. Multivibrators 64–67 are preferably of the positive grid return type, one of which is illustrated in Fig. 2. It is to be understood that only one delay multivibrator in each channel would suffice. Connected to the second multivibrators 65 and 67 in each channel are pedestal generators 68 and 69 which may themselves comprise one-shot multivibrators of the positive grid return type. The pedestal generators are triggered by the multivibrators 65 and 67 to produce a pedestal pulse which when coincident with a pulse desired to be passed opens the normally closed gates. The interconnection 33 of the normally closed gates may be as shown in Fig. 5 wherein the grids of gating tubes 60 and 61 may be connected together and to ground through a common resistor 70.

In operation the first pulse of the series of pulses will be passed through the normally closed gates 60 and 61 by employing a normally closed manual or electronic switch 71 (Fig. 5) which momentarily opens the gates by removing the bias on the gates. The passed negative pulse 72 will trigger the first multivibrators 64 and 66 to an unstable state. The positive square wave 73 resulting is differentiated by the RC input circuit of the second multivibrators 65 and 67, and the negative portion of the differentiated wave triggers the second multivibrators to an unstable state. The square wave output 74 of the second multivibrators 65 and 67 is likewise differentiated as by the RC input to the pedestal generators and the negative portion of the resulting wave triggers the pedestal generators 68 and 69. The operating cycles of the pedestal generators are made equal to the desired time the gate is to be maintained open. The gates 60 and 61 remain closed during the operating time of the delay circuits 62 and 63 and open when the pedestal pulses 75 coincide with an input pulse. As can be seen input pulses 13 not coincident with the pedestal pulse 75 will be blocked since pulses 13 are not sufficient alone to render the gates conducting. The output as in Fig. 3 may be taken from the gate output or the output of the second multivibrators 65 and 67. Again should the gate control circuit of one channel fail the other will be controlling.

Figure 6:
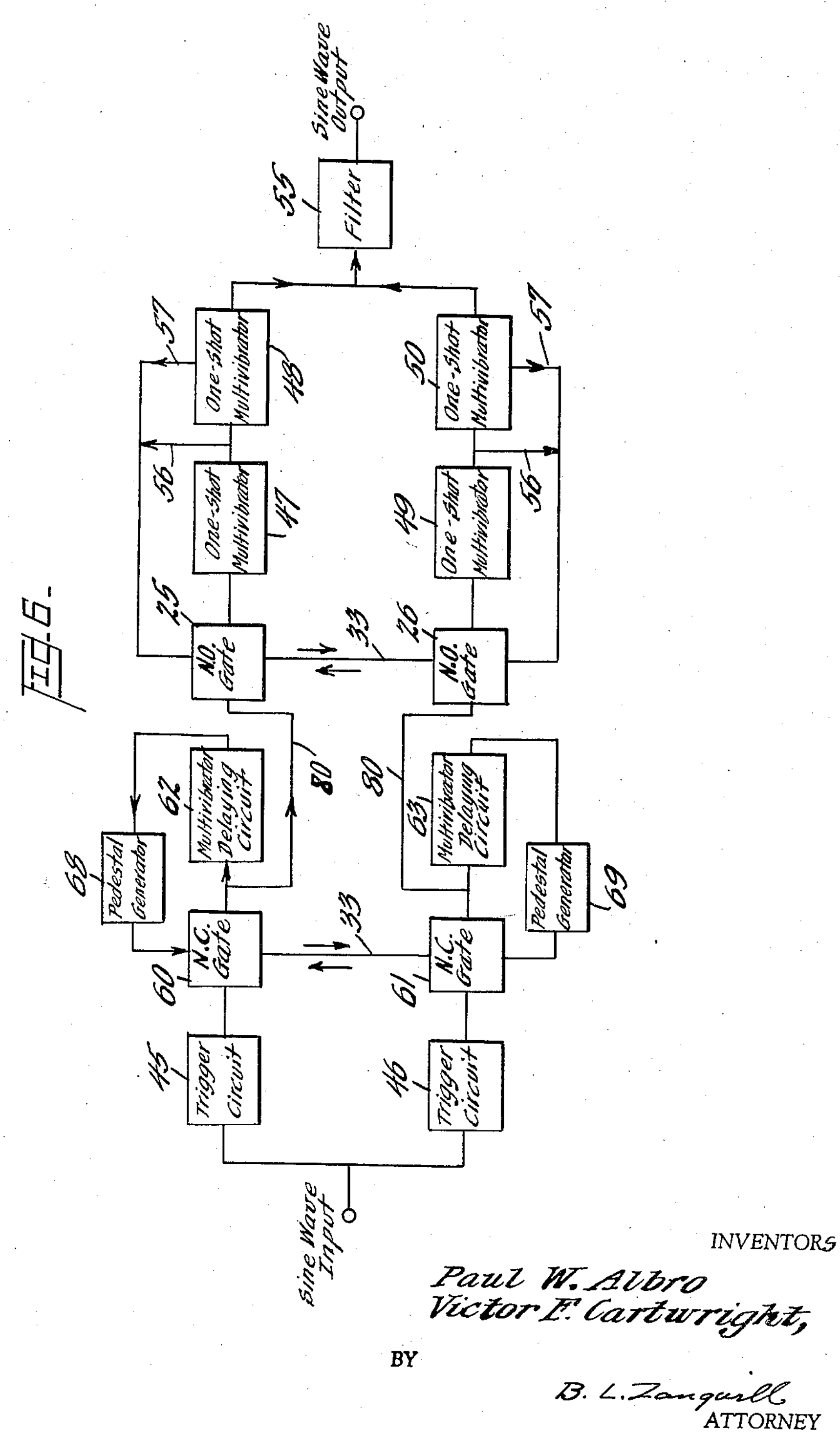
Fig. 6 is a block diagram of a two-stage divider employing a stage of normally closed and a stage of normally open gate circuits.

When division by large factors is desired, it has been found more practical to perform division by stages, each stage, for example dividing by factors not larger than 10. Fig. 6 shows a two-stage divider employing a normally closed gate arrangement as described in Fig. 4 and carrying identical reference numerals, connected by output conductors 80 to a normally open gate arrangement as described in Fig. 3. Inasmuch as the pulse on conductors 80 is negative the normally open gates 25 and 26 described in Figs. 2 and 3 further include a pulse inverting stage to provide a negative trigger for multivibrators 47—50. The operation of each stage is similar to the operation of Figs. 3 and 4 explained above.

The invention as described of two or more interconnected parallel divider channels produced results which were more than twice as good as that produced by one alone. It was found that the probable number of successive operating cycles before a triggering failure occurred would not merely be doubled, but that it would be squared for two channels, cubed for three channels, etc. In other words if there were a probability of one in a million that a gate control circuit would fail to trigger, the probability that both of two channels would simultaneously fail to trigger would be one in a million million.

Obviously many modifications and variations of the present invention are possible in the light of the above teachings. It is therefore to be understood that within the scope of the appended claims the invention may be practiced otherwise than as specifically described.

What is claimed is:

1. A phase stable frequency divider adapted to divide a signal of a predetermined frequency by an integer *n*, comprising means for converting said signal into a series of pulses having a repetition frequency equal to said predetermined frequency, a plurality of channels, means for simultaneously applying said series of pulses to said channels, said channels comprising gate circuits followed by gate control circuits, said gate circuits being adapted to pass one of said series of pulses, said gate control circuits being operable in response to said passed pulses to block said gate circuits for $n-1$ pulses, means interconnecting said gate circuits in each of said channels whereby the blocking of one of said gates simultaneously blocks the others, and output means connected to the output of one of said gate circuits.

2. A phase stable divider adapted to divide a series of pulses by an integer *n*, comprising means for applying said pulses simultaneously to a plurality of divider channels, each of said channels comprising a gate circuit and a gate control circuit connected to the output of said gate circuit, means connecting the output of said gate control circuits to their respective gate circuits to control the bias on said gate circuits, said gate circuits being initially biassed to pass predetermined ones of said series of pulses, said gate control circuits being responsive to said passed pulses to thereby control the bia on its respective gate circuit for a time sufficient to prevent the passage of $n-1$ pulses after each passed pulse, means interconnecting said gate circuits whereby control of the bias of one simultaneously controls the bias on the others, and output means connected to said gate circuits.

3. The invention as recited in claim 2 wherein said gate circuits are of the normally open type.

4. The invention as recited in claim 3 wherein said gate control circuits comprise one-shot multivibrators.

5. The invention as recited in claim 2 wherein said gate circuits are of the normally closed type.

6. The invention as recited in claim 5 wherein said gate control circuits comprise delay circuits, and pedestal generators connected to said delay circuits adapted to supply a pulse coincident with a desired input pulse to open said normally closed gates.

References Cited in the file of this patent

UNITED STATES PATENTS

| | | |
|---|---|---|
| 2,331,986 | Lauer | Oct. 19, 1943 |
| 2,457,974 | Bliss | Jan. 4, 1949 |
| 2,602,160 | Wilkins | July 1, 1952 |
| 2,613,318 | Snyder et al. | Oct. 7, 1952 |
| 2,638,273 | Jensen et al. | May 12, 1953 |